A. J. MATTER AND F. V. CONLEY.
MACHINE FOR EFFECTING ORDERLY DISTRIBUTION OF ARTICLES, PARTICULARLY BUTTONS.
APPLICATION FILED OCT. 30, 1915. RENEWED JUNE 17, 1919.
1,336,785.
Patented Apr. 13, 1920.
7 SHEETS—SHEET 4.
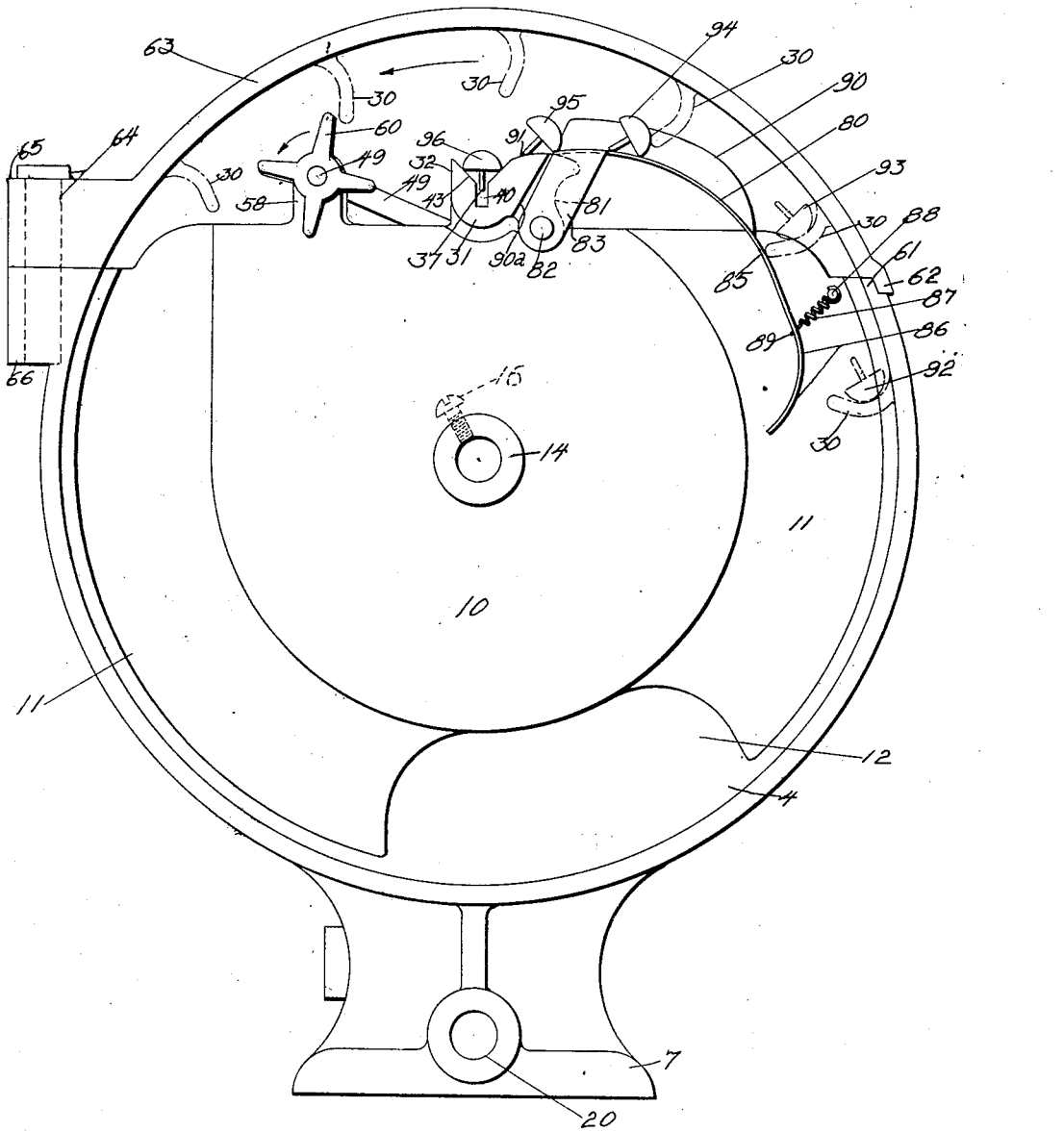
Fig. IV
Inventors:
Albert J. Matter
Fredrick V. Conley
By
Joseph Fitzkins,
Attorney.

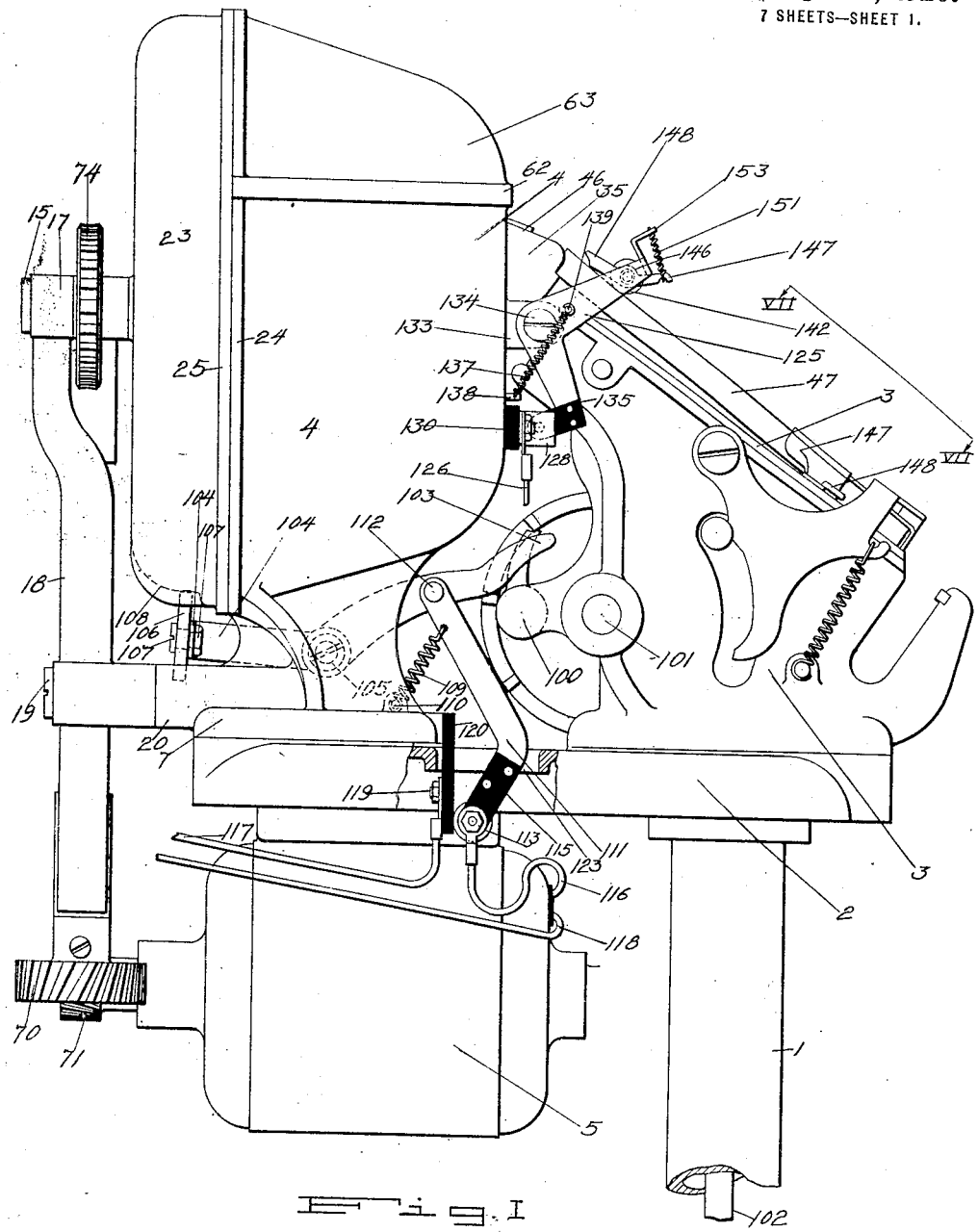

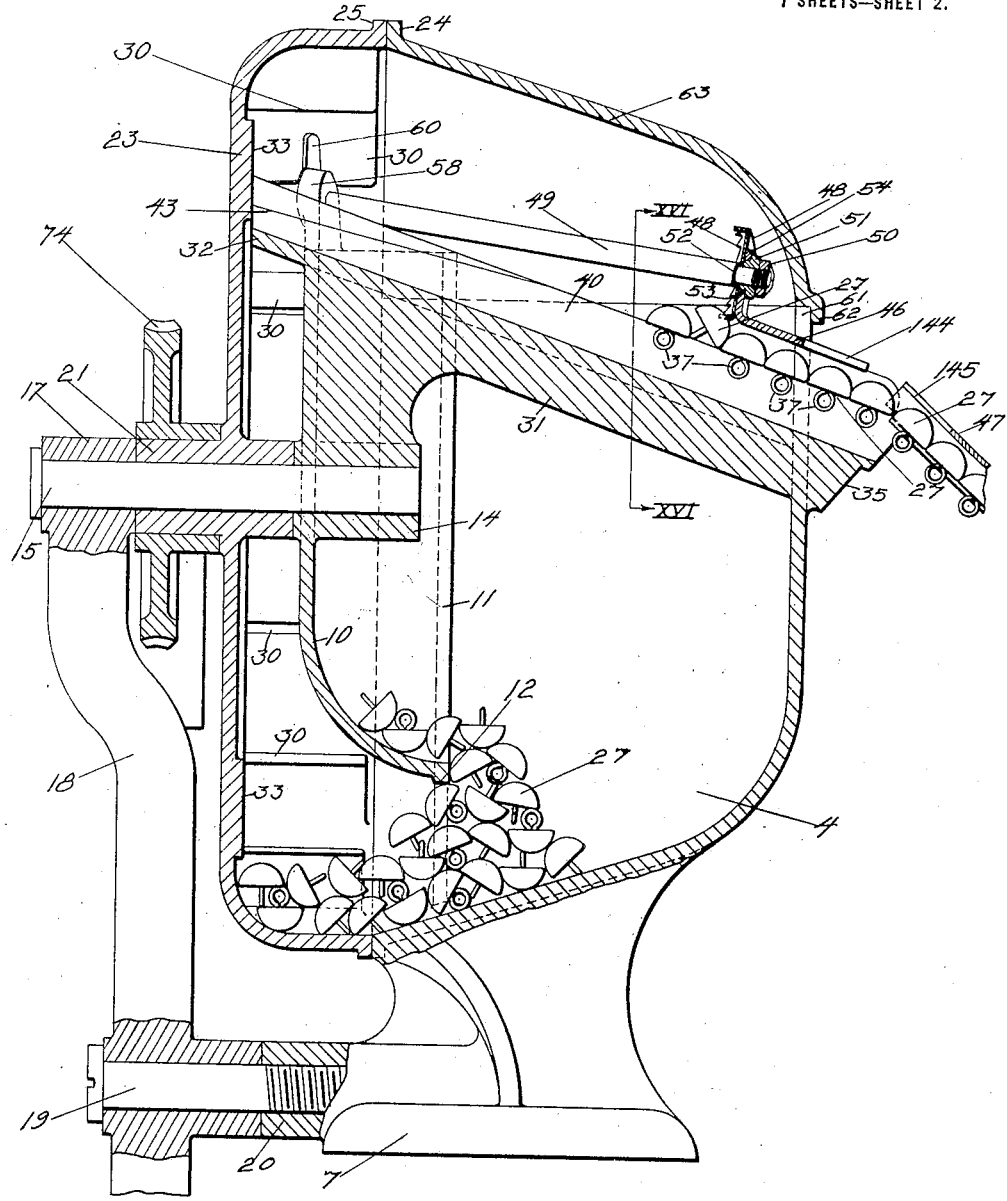

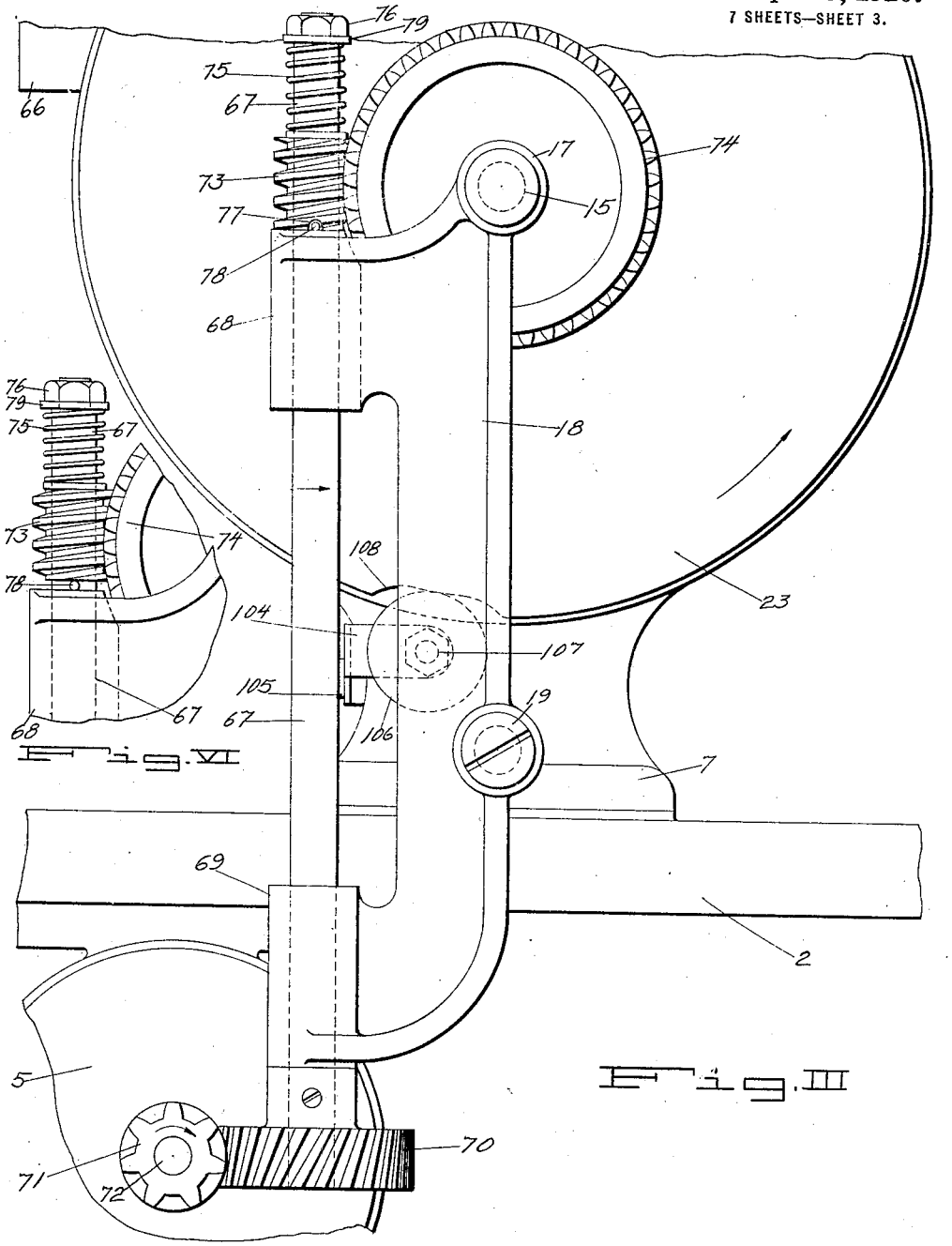

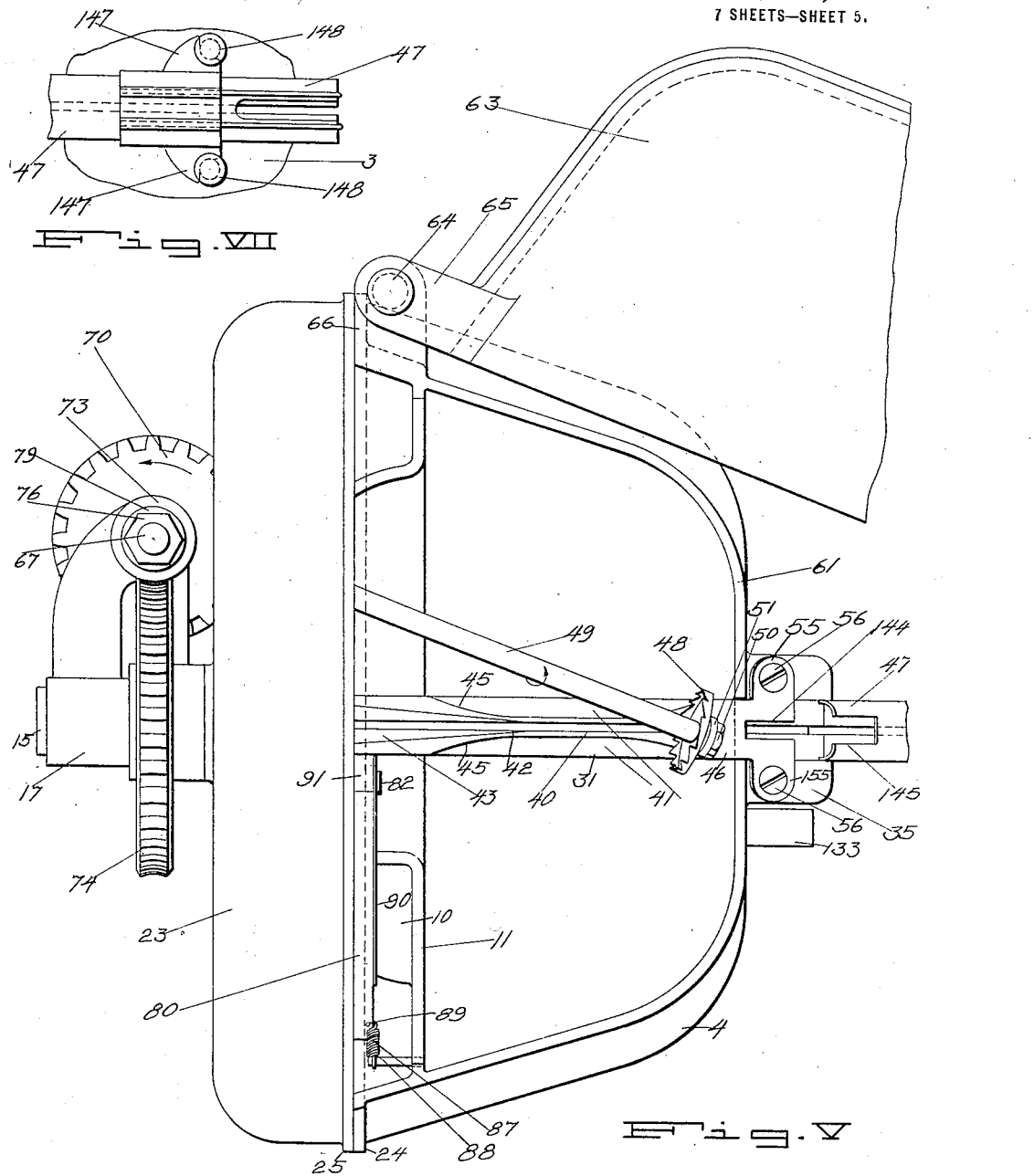

A. J. MATTER AND F. V. CONLEY.
MACHINE FOR EFFECTING ORDERLY DISTRIBUTION OF ARTICLES, PARTICULARLY BUTTONS.
APPLICATION FILED OCT. 30, 1915. RENEWED JUNE 17, 1919.
1,336,785. Patented Apr. 13, 1920.
7 SHEETS—SHEET 6.
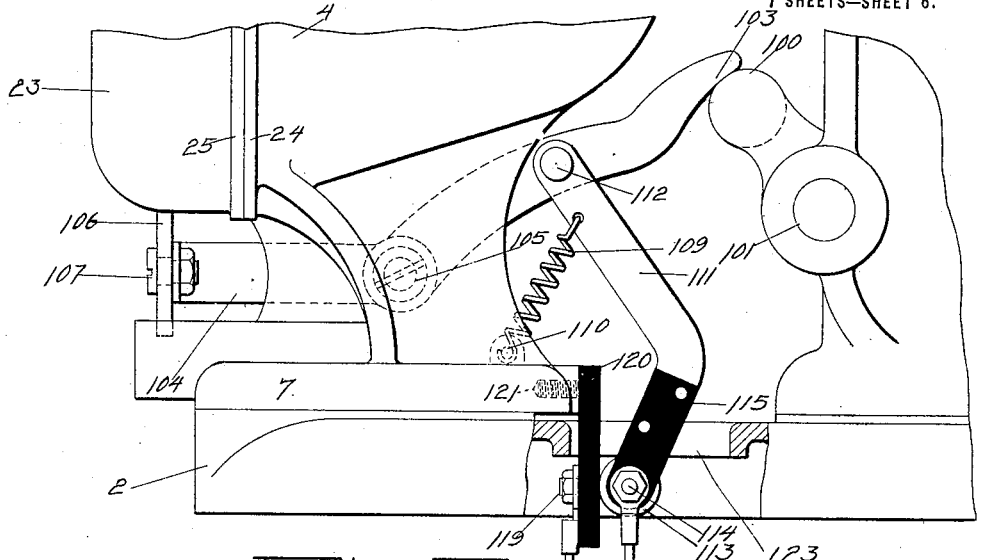
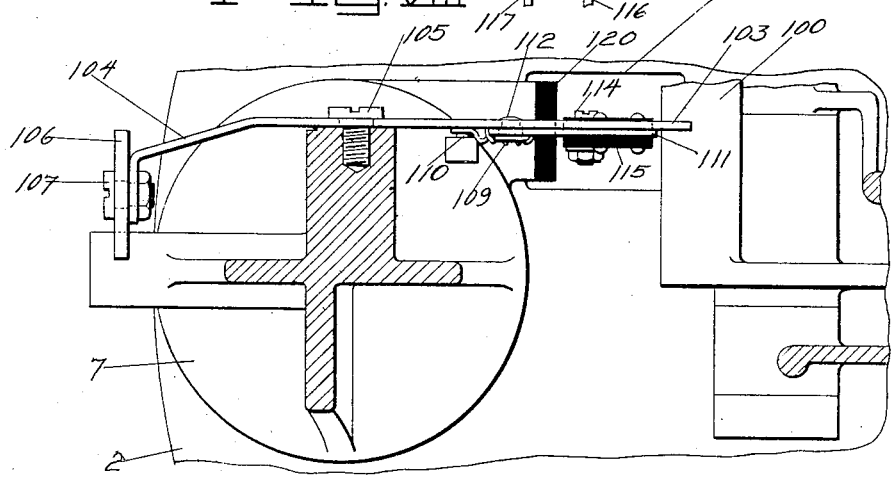
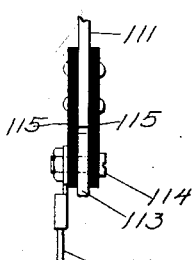
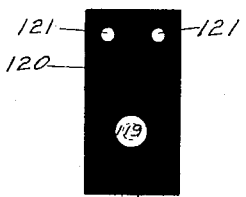
Inventors:
Albert J. Matter
Fredrick V. Conley
By
Joseph L. Atkins,
Attorney.

A. J. MATTER AND F. V. CONLEY.
MACHINE FOR EFFECTING ORDERLY DISTRIBUTION OF ARTICLES, PARTICULARLY BUTTONS.
APPLICATION FILED OCT. 30, 1915. RENEWED JUNE 17, 1919.
1,336,785.
Patented Apr. 13, 1920.
7 SHEETS—SHEET 7.
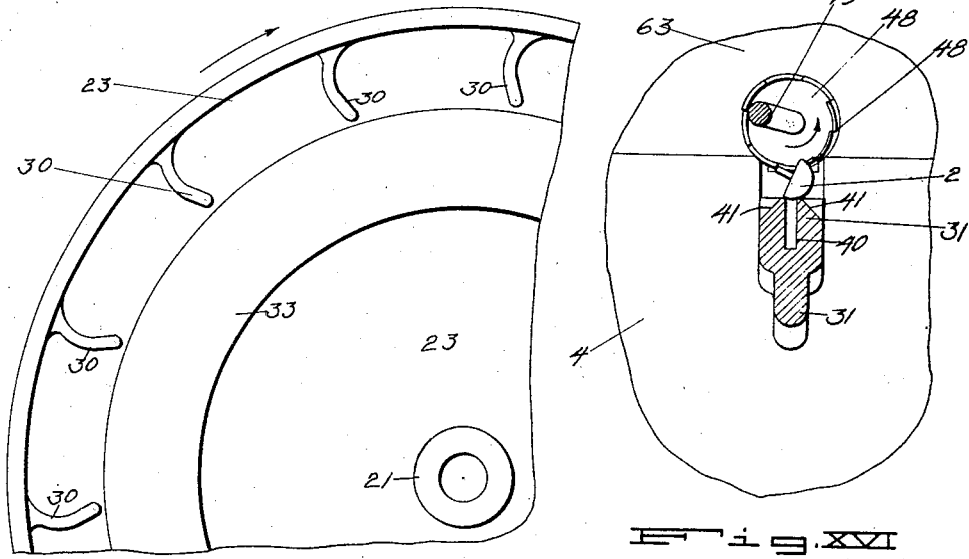
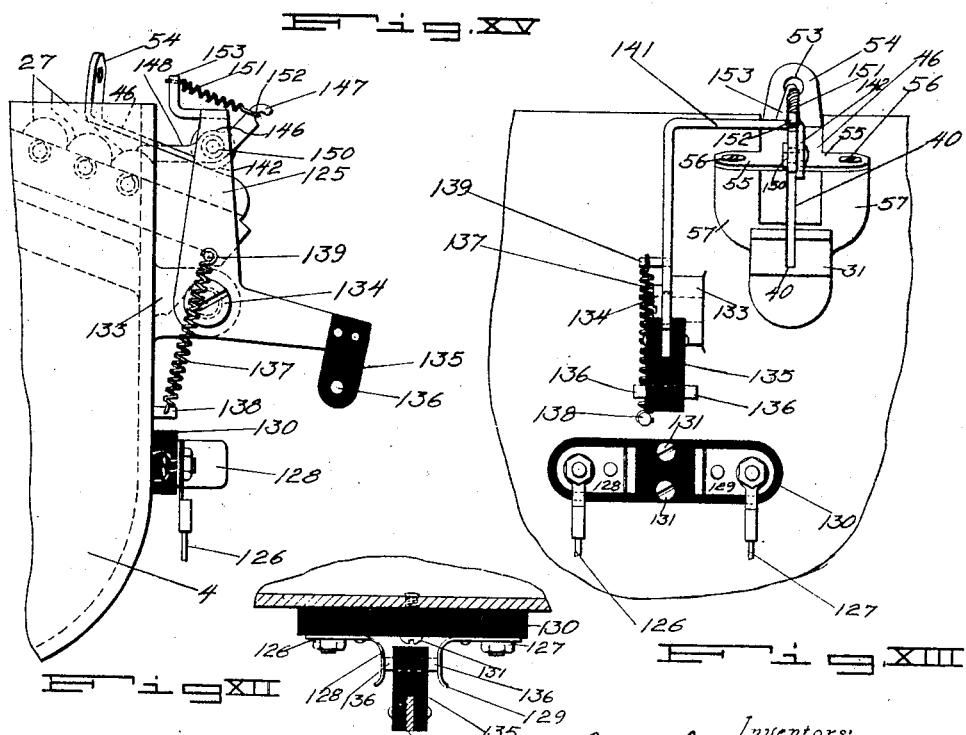

UNITED STATES PATENT OFFICE.

ALBERT J. MATTER AND FREDRICK V. CONLEY, OF PORTLAND, OREGON, ASSIGNORS TO NU AUTOMATIC BUTTON ATTACHING MACHINE COMPANY, OF PORTLAND, OREGON, A CORPORATION OF OREGON.

MACHINE FOR EFFECTING ORDERLY DISTRIBUTION OF ARTICLES, PARTICULARLY BUTTONS.

1,336,785.   Specification of Letters Patent.   Patented Apr. 13, 1920.

Application filed October 30, 1915, Serial No. 58,779. Renewed June 17, 1919. Serial No. 304,922.

*To all whom it may concern:*

Be it known that we, ALBERT J. MATTER and FREDRICK V. CONLEY, citizens of the United States of America, residing at Portland, in the county of Multnomah, in the State of Oregon, have invented a certain new and useful Machine for Effecting Orderly Distribution of Articles, Particularly Buttons, of which the following is a specification, reference being had to the accompanying drawings.

Our invention relates to machines for automatically assembling and arranging into order individual articles from a disordered collection thereof. Our machine is, by slight variations contemplated within the scope of our invention, adapted to handle many varieties of small articles, as for example, nails or tacks in order to present them to a nailing machine; but besides its general application as above stated its application contemplated specifically herein is for setting buttons into orderly array and for feeding them, one by one, to a button attaching machine.

Our machine belongs to and comprehends all that is ordinarily implied in the term "hopper" as it is used in the art relating to button attaching machines, and for convenient brevity we shall hereinafter refer to it from time to time as a hopper, but it occupies a somewhat larger field, and is adapted for use either as a separate and independent machine or as an adjunct to another machine, such for example, in above indicated specific application, as a button attaching machine, which, in such a combination, we hereinafter designate generally as the major machine.

Selecting from among a number only a few for special mention in this general statement, we designate the following as some of the more important objects of our invention.

Heretofore in hoppers or feeding devices for button attaching machines or other major machines the operation of the hopper is made to depend upon the intermittent operation of the major machine to which the hopper is subsidiary. It is found in practice that such provision fails to effect, under all conditions, an adequate feed supply of articles from the hopper. This objection our invention overcomes in providing for the operation of the hopper independently of the operation of the major machine and, preferably, through the action of a constant driving power as distinguished from the intermittent action which characterizes button attaching-machines or the like.

At the same time, while, for the sake of economy, we prefer in combined machines to make the operation of the hopper driving power partly dependent upon the operation of the major machine, we also prefer to provide for independent operation thereof at will, whereby the major machine may be operated without operating the hopper or vice versa.

Another important feature of our machine is found in the provision of means for automatically interrupting the operation of the hopper if in the course of its operation the hopper encounters any serious obstruction or resistance to its operation, and we prefer to provide in such means provision for interrupting the operation of the hopper without interrupting the movement of the mechanism which drives it. The point last named is of special importance if the hopper driving power employed be, as it preferably is, electrical.

By our invention, the interior of the hopper proper or in other words the receptacle for articles in mass is divided into two separate but communicating compartments, one constituting a mere receptacle, and the other a receptacle wherein the operation of the article lifter constitutes the first step toward the assembling of the articles into orderly array.

Moreover, we provide a positively actuated clearing member for the alining member whereby the latter is swept clean of articles that present themselves out of proper alinement; and also provide means for delivering articles to the alining member with a gentle sliding delivery as contradistinguished from the drop delivery heretofore depended upon in the class of hoppers to which our invention belongs. In the drop delivery the articles and particularly buttons tend to bounce from place to place within the hopper proper and in that way to interfere with the functioning of the machine. By our invention that tendency is substantially eliminated with the effect of added efficiency in the machine.

In carrying out the various objects of our invention, care is exercised in the design and construction of our machine to guard against any tendency of the mechanism to clog in service, and at the same time to produce a machine of improved simplicity, durability and economy of manufacture throughout.

What constitutes our invention will be hereinafter specified in detail and succinctly set forth in the appended claims.

In the accompanying drawings which constitute a part of this specification,

Figure I is a side elevation partly in section of a portion of one of a type of button attaching machines, presented only by way of example of a major machine, and of our invention complete in present preferred form of embodiment, all parts being shown in position as at rest.

Fig. II is a central vertical section partly in elevation of part of the machine shown in Fig. I and embodying our invention.

Fig. III is a rear elevation of part of the subject matter of Fig. II.

Fig. IV is a rear elevation of the interior of the hopper proper with the lifter-bowl and outer supporting members removed.

Fig. V is a top plan view of the subject matter of Fig. II, with the cover partially broken away and swung aside to expose the interior of the hopper proper and parts contained therein.

Fig. VI is a detail side elevation of the upper end of the lifter-bowl driving shaft and connections, showing the disengaging end thrust of the worm sleeve on said shaft.

Fig. VII is a top plan view of the lower end of the button chute and its engaging mechanism.

Fig. VIII is a view of a reproduction on slightly enlarged scale of a portion of Fig. I, showing the motor switch thrown into the circuit making position by operation of members shown of the major machine.

Fig. IX is a horizontal section of Fig. VIII taken so as to show the members of the motor switch in plan view.

Fig. X is an edge view of the contact end of motor switch lever detached.

Fig. XI is a front elevation of the motor switch fixed contact and its insulating plate detached.

Fig. XII is a reproduction on slightly enlarged scale of a portion of Fig. I, showing motor circuit switch lever open to break circuit and to shut off the button feed.

Fig. XIII is a front elevation of the subject matter of Fig. XII.

Fig. XIV is a horizontal sectional view of a portion of the subject matter of Fig. I, taken so as to show the circuit switch terminals in top plan view.

Fig. XV is an interior elevation of one quadrant of the lifter-bowl, including its hub complete.

Fig. XVI is a section on line XVI—XVI of Fig. II.

Referring to the numerals on the drawings wherein like numerals refer to the same elements throughout, 1 indicates a preferably tubular standard which supports in the usual manner as upon a pedestal, not illustrated, a table 2 which, if our machine is combined with another to which it is subsidiary, may be large enough to accommodate a major machine 3 and the body 4 of our machine above it and its motor 5 below it.

The motor, of any preferred type, and the body being of any suitable contour and dimensions, we prefer to embody the latter in a single bowl shaped casting with a pedestal 7, compare particularly Figs. I and IV.

The interior of the body 4 is preferably provided, as shown in Figs. II and V, with a partition wall 10 which preferably comprises a flange 11 that extends around the greater part of the inner circumference of the body being omitted at the top thereof for lack of function and being provided below with a button discharge aperture 12 that is preferably disposed toward one side of the vertical diameter of the body as is clearly illustrated in Fig. IV.

The wall 10 carries, concentrically to the circular periphery preferred of the body 4, a hollow boss 14 within which one end of a horizontal shaft 15 is mounted and preferably secured as by an abutment screw 16, see Fig. IV. The other end of the shaft 15 is carried in the head 17 of an upright 18 secured as by a headed screw 19 that takes into a hollow boss 20 provided for its accommodation in the pedestal 7, see Fig. II.

Snugly fitted between the opposing faces of the head 17 and the boss 14 we prefer to provide, as shown in Fig. II in preferred form of embodiment, upon the shaft 15 a rotatable hub 21 that is incorporated with and preferably forms a part of a button lifter-bowl 23 that is complementary to the body 4 with whose rim 24 the correspondent rim 25 of the lifter-bowl abuts and against which it rotates in close juxtaposition.

The fixed body 4 in combination with its complementary rotative member 23 constitutes a closed receptacle adapted to receive articles, for example the buttons 27 illustrated in Fig. II, which being introduced into the body are confined for the most part by the wall 10 within the interior of the body.

So long as the buttons 27, or other articles, remain within the body 4 they lie undisturbed by the operation of the machine except in so far as they respond to the force of gravity which tends to draw them through the aperture 12 into the lifter-bowl 23. While said bowl is rotating a constant succession through the aperture 12 of articles (with which, of course, the body 4 must be kept supplied) is maintained, such succession being in part dependent upon the rotation of the bowl, by whose action the aperture 12 is kept open for the passage of the articles through it.

To qualify it for the performance of its lifting function the inside of the bowl 23 is provided with a succession of suitable and preferably equidistantly disposed, transversely curviform shelves or scoops 30, that are preferably made integral with the bowl and whose open ends extend toward the interior of the body, whence the supply of buttons 27, or articles to be lifted, gains access to them through the aperture 12 in flange 11 of the wall 10.

It may be here observed that the locating of the aperture 12 to one side of the vertical as shown in Fig. IV prevents the choking of the aperture, and thereby serves to facilitate and insure the feeding of articles through it.

31 indicates an alining member which being preferably made integral with the body 4 and the partition wall 10, extends on a downward incline from one end 32, where it makes substantially snug abutment against an annular zone 33 provided for the purpose upon the inner face of the bowl 23, to the other end 35 where it penetrates the body 4 and projects outside of it, as shown clearly in Fig. II.

It is the function of the member 31 to receive all articles that the lifter-bowl 23 catches in its scoops 30, indiscriminately, and to discharge from its lower end 35 so many of them as dispose themselves in orderly array in passing from the upper to the lower end of the member 31.

In dealing with different articles different forms of alining member suited to different articles must be selected in accordance with principles of selection well understood in the art. The form of alining member shown in the drawings is adapted for use in the feeding of shank buttons, and the shank 37 of each button is the feature relied upon for determining the proper relationship between the button and the alining member. Accordingly the alining member shown herein is provided with a groove 40 which extends through it from end to end, and which is of a width and depth suited to accommodate and set in alinement the shanks of the buttons to the size whereof it is adapted.

It was in the last but one preceding paragraph specified that the articles, specifically buttons, are all fed to the member 31 indiscriminately. Of that number only a small proportion, possibly, may be presented so that their shanks will properly enter the groove 40 and assume orderly arrangement therein preparatory to discharge of buttons from the end 35 of the member 31. It is this consideration, it may be observed, that makes it necessary, in practice, to provide for such uninterrupted actuation of the lifter-bowl 23 as shall afford that supply of articles to the alining member which will practically insure, in the operation of the machine a constant output without any interruption.

In order to provide means for disencumbering the alining member promptly of all buttons save only such as are properly presented to it, we prefer to make the outer faces 41 of the walls of the groove 40, below a point 42 substantially as shown in Fig. V, divergent from the groove in cross section as is shown clearly in Figs. V and XVI. Above the point 42, as shown in Fig. XVI, we prefer to provide in the top of the member 31 a downwardly tapering trough 43 which terminates substantially where the uniform bevel of the faces 41, merging in chamfers 45 begins.

The effect of the construction last described is that of the many buttons caught in the trough 43 and sliding down the inclined member 31, the greater number whose shanks are downwardly disposed so as to enter the groove 40 are properly alined therein. After passing the point 42 the remaining buttons, for the most part, topple back from the faces 41 into the interior of the body 4 whence they again pass on through the aperture 12 to be again caught up by the lifter-bowl and again presented to the alining member. When the buttons arrayed by the alining member reach approximately the end of their downward travel therein they are protected in their exit by a cover plate 46 which guides them unerringly to their ultimate discharge, as into a button chute 47 of familiar use in the art.

In order to insure against interruption of the operation of the machine by an occasional disorderly button sticking to the alining member 31 below the point 42, from any cause whatsoever, we prefer to provide a positively actuated and otherwise novel clearing member, which may be practically relied upon to effectually sweep the alining member clear of all obstructing articles.

The positive operation of the clearing member contributes in large measure to its success, but it is aided therein by the extension of the member 31, throughout a considerable portion of its length, across a large open space defined within the interior of the body 4, wherein, by means which our invention provides, discharge or play of buttons above the member 31, which is a factor that produces clogging in other hoppers, is substantially eliminated.

Our clearing member preferably consists of a sweeper or notched wheel and preferably a notched crown wheel 48 that is secured to the reduced end of a shaft 49 as by means of a terminal nut 50 and an intermediate bearing bushing 51, interposed between the nut and shoulder 52 or the shaft 49, as shown in detail in Fig. II. The bushing 51 revolubly supports the shaft 49 in a bearing 53 provided for it in an upright 54 on the inner end of the cover plate 46, which is preferably secured as by its side lugs 55 and screws 56 to lateral supports 57 on the end 35 of the alining member 31.

The end of the shaft 49 opposite that which carries the wheel 48 is revolubly mounted in a stud 58, suitably disposed, preferably upon the partition wall 10, compare Figs. II and IV. It terminates at that end in a fixed star wheel 60 which is operatively disposed in the path of travel of the scoops 30 so that it engages and receives a rotative impulse from each scoop as it passes it in the rotation of the bowl 23. By this means a succession of smart strokes or vibrations is imparted to the wheel 48 at frequent intervals, which, if the wheel be adjusted to a proper relative height above the top of the alining member, will suffice to keep said member swept clear of obstructions such, for example, as would be otherwise interposed by an uptilted button as shown in Figs. II and XVI.

The top of the body 4 is preferably defined by a rim 61 against which fits snugly the overlapping edge 62 of a cover 63 hinged preferably by a vertically disposed pintle 64, connecting lugs 65 and 66 upon the cover and the body, respectively.

Rotation of the lifter-bowl 23 may be communicated by any suitable driving mechanism which, possessing the relationship already indicated, preferably derives its power from the motor 5. In its present preferred form of embodiment it comprehends a revoluble shaft 67 mounted in vertical bearings 68 and 69 provided for it in the upright 18 (see Figs. I, II, III, and V). At its lower end the shaft 67 carries a fixed worm gear 70 that meshes with a worm pinion 71 fixed to a projecting end of the commutator shaft or other revoluble member 72 of the motor. At its upper end it carries a worm 73 that intermeshes with a worm gear 74 fixed to the hub 21 of the bowl 23, to accommodate which the upright 18 is preferably deflected as shown in Fig. II.

In order to provide for the automatic interruption of the operation of the hopper if it should encounter any serious resistance, as suggested in the general statement, we employ as a preferred means for accomplishing that purpose to make the worm 73 in the form of a sleeve longitudinally movable and rotatable upon the shaft 67. It is yieldingly impelled to seat against the upper face of the bearing 68 as by a spring 75 coiled about the shaft 67 and interposed between it and a washer 79 held in place upon the shaft 67 by a nut 76 threaded to the upper end of the shaft. At its lower end the worm sleeve 73 is provided with a notch 77 which is adapted to engage, when registered therewith, a pin 78 upon the shaft 67, whose function it is both to position the shaft in its bearings and to impart rotation to the sleeve 73 whenever the latter is coupled to it by its engagement with the notch 77. Such engagement marks the normal relationship of the notch and the pin which serves to communicate continuous motion from the shaft 67 to the sleeve 73 and through it to the gear 74 fixed to the hub 21 of the lifter-bowl 23; but if resistance to the free rotation of the bowl be interposed, as may be demonstrated by the pressure of a finger lightly applied to the outside of the bowl, it will immediately cause the wheel 74 to lift the worm sleeve 73, when, upon disengagement of the notch 77 from the pin 78, the shaft 67 will run free of the sleeve 73 so long as interruption or retardation of movement of the bowl continues. Upon cessation of such interruption or retardation the engagement broken thereby is renewed and rotation is again imparted from the shaft 67 to the bowl 23 as before. Such interruption or retardation being most likely to occur, if at all, from some obstruction within the hopper, as for example, by a broken button or a piece of trash becoming wedged between the working parts of the mechanism, it is desirable to make the automatic mechanism called into requisition thereby quickly and easily responsive. This may be accomplished through the measure of the resistance, determinable as by adjustment of nut 76, of the spring 75 to the uplift of the worm sleeve 73.

That distinctive feature of our invention which is referred to in the general statement under the term sliding delivery of articles to the alining member will be made clear upon reference to Fig. IV of the drawings.

In that figure the end 32 of the alining member 31 with the flared end of its trough 43 is shown in elevation. On that side of the alining member toward which the scoops 30 travel as the bowl 23 is rotated in the direction of the arrow we provide a preferably resilient delivery plate 80 the same being preferably hinged to the alining member 31, as upon a lug 81 thereon provided for the accommodation of a pintle 82 through it and cheek pieces 83 upon opposite sides of it. The delivery plate 80 is preferably made of sheet metal and of a length a little greater than the distance between alternate scoops 30 in the bowl 23. It is preferably carried so as to permit a scoop 30 to make sweeping contact with it at about its middle as indicated at 85 and to exclude contact with it at other points in its circuit. The free end of the plate 80 is preferably deflected toward the axis of the bowl 23 as indicated at 86, and yieldingly supported with uplift toward the scoops 30 as by a tensile spring 87 hitched at one end to a pin 88 projecting from the flange 11 of the wall 10 and at the other to the plate 80 as indicated at 89. A guard plate 90 is preferably provided on one side of the plate 80, extending substantially from the point 85 toward the discharge end of the plate.

The slight rocking movement of the plate 80 upon its pintle 82 is limited in one direction as by a shoulder 90ª on the lug 81, so that the discharge end of the plate 80 is, by action of the spring 87, normally held in close juxtaposition to the platform 91 upon the adjacent side of the alining member 31 which side is for its accommodation made slightly wider and higher than the other side of the trough 43.

For the better explanation of the operation of the article delivery above described, the buttons shown in Fig. IV are distinctively numbered 92, 93, 94, 95, and 96 in respect to the different positions they assume in the said operation. Button 92, for example, represents any button caught in a scoop 30, wherein it may occupy any position it may happen to assume, the one shown being that in which the shank of the button is uppermost. 93 indicates the same button advanced by movement of its retaining scoop, through rotation of the bowl 23, to a position at which it is almost ready to fall by gravity upon the plate 80. 94 indicates the same button deposited upon the plate and about to be liberated from contact with the scoop. 95 indicates a button deposited upon the platform 91 and ready to slide into position occupied by button 96.

From the description last preceding it will be observed that by the means indicated a gentle sliding delivery of articles to the alining member is effected and that any violent or bouncing movement such as is usually consequent upon a dropping delivery of the articles is wholly eliminated. The effect is to increase very considerately the efficiency of the machine.

As has been set forth in the preceding general statement we prefer to employ a separate motor for driving the lifter-bowl 23, but at the same time we prefer to make its operation dependent upon that of the major machine when the hopper is combined with a major machine. Accordingly we show in Figs. I and VIII to XIV inclusive preferred mechanism for accomplishing that end.

In Fig. I we show upon the major machine that which may be denominated in respect to the hopper an actuator 100. It consists of a rocking lever fulcrumed at 101, and responds to every downward pull upon a pedal pitman 102 within the standard 1, by which the major machine is ordinarily operated. In Fig. I the actuator lever is shown at rest. In Fig. VIII it is shown as lifted by downpull of the pitman 102. The actuator is intended to represent any available member in any type of major machine from which the intermittent motion thereof may be operatively communicated to set the hopper driving mechanism in motion. In its path of motion is disposed the snub end 103 of a rocking lever 104 pivoted as by a screw 105 (compare Figs. VIII and IX) to the pedestal 7, which is, for its accommodation, preferably made of the shape shown in cross section in Fig. IX.

Upon its end opposite 103 the lever 104 preferably carries, substantially at right angles to its longitudinal axis, a roller 106 which is revolubly secured to the bent end of the lever as by a bolt 107. The roller normally tends to enter a recess 108 in the periphery of the bowl 23 (see Figs. I and III) when the end 103 of the lever 104 may then be lifted, but when the lever 104 is rocked upon its pivot 105 and so lifted as by uplift of the actuator 100, engagement of the roller 106 with the unbroken periphery of the bowl prevents return of the lever 104 until the bowl has made at least one complete revolution. By this means a complete rotation of the lifter bowl 23 with its consequent feed of articles to the alining member is insured automatically with each stroke of the pitman 102, thereby insuring at all times adequate supply of articles to the major machine.

The normal tendency toward said engagement of the roller 106 with the bowl 23 may be derived from the power of a tensile spring 109 hitched at one end to the pedestal 7 as indicated at 110, and at the other to a motor switch lever 111, pivoted as indicated at 112 to the lever 104 and carried thereby. The function of the spring 109 is to impart motion, as above described, to the lever 104 and at the same time to attract the switch lever 111, on which is provided near its free end an insulated roller-contact 113, mounted, for axample, as shown in Fig. X upon a pivot 114 between insulating plates 115 riveted to the lever 111. The roller-contact 113 constitutes a terminal to a flexible electric main 116 of the motor 5 which is energized through mains 117 and 118 that communicate with any suitable source of electric energy supply not illustrated. The main 116 is, in effect, a continuation, through its terminal 113, of the main 117 which is provided with a fixed terminal 119 whose contact face is presented as through an insulating plate 120 screwed to the pedestal 7 as indicated at 121, into contact with the roller 113. Comparison of Figs. I and VIII will disclose the operation of making and breaking contact through the terminals 119 and 113. The latter, riding against the plate 120, is normally depressed by action of the spring 109 to the contact breaking position shown in Fig. I, but when lifted by the lever 104 it makes contact through terminal 119 to complete driving circuit through the motor. A throat 123 is preferably provided in the table 2 to accommodate the plate 120 and the working free end of the switch lever 111.

The operation as above described of the lever 104 will amply serve the purpose for which it is intended, but upon occasion it is desirable to be able to effect operation of the major machine without operating the hopper, we therefore prefer to employ in the motor circuit a make and break switch-lever 125 which may be cut in at any preferred point, and which preferably embodies in itself a mechanical button feed cutoff. Because of the presence of the latter it is convenient to extend the motor circuit as by leads 126 and 127 to a convenient point of access where a pair of resilient terminals 128 and 129 insulated upon a base 130 screwed to the body 4 as indicated at 131, are placed.

The lever 125 is preferably a bell crank lever and pivoted at its angle to a lug 133 projecting from the body, 4, as by means of a screw 134. The length of one arm of the lever 125 is such as to bring one end of it into operative proximity to the terminals 128 and 129, and the length of the other arm such as to bring its other end into like proximity to the upper end of the chute 47 and the top of the end 35 of the alining member that is contiguous thereto.

The end of the lever 125 first above mentioned carries an insulating head 135 that carries, insulated within it, a transverse conductor 136 which is adapted, through movement of the switch-lever 125, to make and break contact between the terminals 128 and 129, compare Figs. XIV and XIII. A tensile spring 137, hitched at one end to a pin 138, projecting from the body 4, is hitched at the other end to the lever 125, as to a pin 139 thereon so disposed as to pass the center of the pivot 134 on the uplift and downthrow of the lever, respectively, and is consequently adapted to hold the lever to either of those two positions to which it may be shifted.

The other or upper end of the lever 125 is preferably provided with a crossover 141 (see Fig. XIII) and a terminal extension 142 disposed to accommodate a button dog in accurate alinement with registering terminal longitudinal slots 144 and 145, respectively, in the cover plate 46 and the top of the button chute 47 (see Figs. II and V). The button dog preferably consists of a bent lever comprising a curviform median portion or body 146, a tail 147, and a nose 148. It is pivotally united to the deflection 142 of the lever 125 as by a bolt 150, its nose being downtilted by the force of a tensile spring 151 hitched to the tail as indicated at 152 and to a lug 153 on the crossover 141. It is the office of the nose 148 to enter the slot 144 in the cover plate 46 whenever the lever 125 is thrown into circuit breaking position, as shown in Fig. XII, and by impingement against the foremost button in the groove 40 of the alining member 31 to push back and cut off the feed of buttons therefrom.

When the lever 125 is in its circuit making position as shown in Fig. I, the terminal extension 142 riding upon top of the chute below the end of its terminal slot 145 serves, through the power of the spring 137, to confine in place the upper end of the chute 47 whose lower end is secured in position, preferably by engagement of its wings 147 with headed studs 148 carried by the major machine 3.

In view of reference to operation made from time to time in the foregoing specification, the following brief description of the operation of our invention as above described in preferred embodiment will be all sufficient to enable one skilled in the art to arrive at a full understanding of it.

Buttons are kept supplied, through the opening therein that is closed during the operation of the machine by the cover 63, to the interior of the body 4 which is preferably of ample capacity to receive an adequate supply. Within the body in the space defined by the wall 10, the buttons remain undisturbed except as they are drawn by gravity to seek an exit through the aperture 12, through which they pass and gain access to the scoops 30 of the lifter-bowl 23. Catching the buttons as they are supplied through the aperture 12, the scoops, during periods of rotation of the bowl 23, lift them and in the gentle manner of delivery heretofore described discharge them upon the delivery plate 80 and thence by the inclined alining member 31, by which, in orderly array effected, in the manner specified, by the operation of the machine, they are, in like manner, fed out by action of gravity.

The above description of operation applies to our machine whether it be used independently of or in conjunction with a major machine.

The driving power which operates the bowl 23 is derived preferably from the motor 5, whose motion is, if our machine be subsidiary to a major machine, usually made to depend upon the movement of the actuator 100, thereof; but the bowl may be at any time, if desired, caused to operate under its own driving power upon manipulative uplift of the end 103 of the lever 104.

For clearness and completeness of the present description it may be here stated not without some repetition that the coaction of the roller 106 and recess 108 in the bowl 23 compels rotation of the bowl, when set once in motion, to continue for the period of one complete revolution of the bowl, thereby effectually insuring a supply of buttons to the major machine at all times sufficient to meet its demands; but it is proper to add that when the hopper is used as an independent machine the function derived from the said coaction may be dispensed with.

Moreover, by making completion of the motor circuit dependent upon position of the switch-lever 125, and providing the latter with a button dog as described, the breaking of the circuit by manipulation of said switch-lever always insures interruption of the button feed. Opportunity is thereby afforded not only for operation of the major machine independently of the hopper, but also for shift of button chutes as occasion may require.

What we claim is:

1. In a machine of the kind described, the combination with a fixed hollow body, a rotary lifter-bowl juxtaposed thereto, and its driving mechanism, of means for effecting orderly discharge from the machine of articles supplied by rotation of the bowl, and an apertured partition wall transversely of said means separating the interiors of the bowl and body.

2. In a machine of the kind described, the combination with a fixed hollow body, a rotary lifter-bowl juxtaposed thereto, and its driving mechanism, of a partition wall dividing the interiors of the bowl and body, respectively, into separate communicating compartments, article lifting means within the bowl exclusively, and an alining member projecting beyond said partition and in operative communication with said means and adapted to receive articles and to discharge them in orderly array.

3. In a machine of the kind described, the combination with a fixed hollow body, a rotary lifter-bowl juxtaposed thereto, and its driving mechanism, of a partition wall dividing the interiors of the bowl and body, respectively, into separate communicating compartments, article lifting means within the bowl exclusively, and an alining member in operative communication with said means and adapted to receive articles and to discharge them in orderly array, said partition wall extending across the vertical diameter of the body and being provided with an aperture, as means for communication through it, located toward one side of said vertical diameter.

4. In a machine of the kind described, the combination with a fixed hollow body, a rotary lifter-bowl juxtaposed thereto, and its driving mechanism, of a partition wall dividing the interiors of the bowl and body, respectively, into separate communicating compartments, scoops upon the interior of the bowl adapted to carry articles from the bottom toward the top of the bowl and there deliver them, and an alining member projecting from opposite sides of said partition wall adapted to receive said articles and provided with means for disposing them and for discharging them in orderly array.

5. In a machine of the kind described, the combination with a body, and a relatively movable member constituting therewith a case and adapted to carry articles from the bottom toward the top thereof, of an alining member adapted to receive said articles from said member and provided with means for disposing them and for discharging them in orderly array, and means for effecting sliding delivery of articles from said movable member to the alining member.

6. In a machine of the kind described, the combination with a body, and a relatively movably member constituting therewith a case and adapted to carry articles from the bottom toward the top thereof, of an alining member adapted to receive said articles from said member and provided with means for disposing them and for discharging them in orderly array, and means for effecting sliding delivery of articles from said movable member to the alining member, said means comprising a delivery plate intermediate the point of delivery of articles from said movable member and the alining member.

7. In a machine of the kind described, the combination with a body, and a relatively movable member adapted to carry articles from the bottom toward the top thereof, of an alining member adapted to receive said articles from said member and provided with means for disposing them and for discharging them in orderly array, and means for effecting sliding delivery of articles from said movable member to the alining member, said means comprising a resilient delivery plate over which the articles pass intermediate the point of delivery of articles from said movable member and the alining member.

8. In a machine of the kind described, the combination with a body, and a relatively movable member adapted to carry articles from the bottom toward the top thereof, of an alining member adapted to receive said articles from said member and provided with means for disposing them and for discharging them in orderly array, and means for effecting sliding delivery of articles from said movable member to the alining member, said means comprising a yielding delivery plate intermediate the point of delivery of articles from said movable member and the alining member, and coöperating with the side of said alining member to present a surface upon which the articles travel in passing thereto.

9. In a machine of the kind described, the combination with a fixed body, a rotary lifter bowl juxtaposed thereto, and its driving mechanism, of scoops within the lifter bowl, an alining member, and a delivery plate located in the path of movement of the scoops and in operative disposition thereto and to the alining member.

10. In a machine of the kind described, the combination with a body, and a relatively movable member having pockets adapted to carry articles from the bottom toward the top thereof, of an alining member adapted to receive said articles from said member and provided with means for disposing them and for discharging them in orderly array, and a positively actuated clearing member disposed in operative proximity to the alining member, said clearing member comprising a rotatable shaft in operative driven communication with the pockets on said movable member.

11. In a machine of the kind described, the combination with a fixed hollow body, a rotary lifter-bowl juxtaposed thereto, and its driving mechanism, of a partition wall dividing the interiors of the bowl and body, respectively, into separate communicating compartments, scoops upon the interior of the bowl adapted to carry articles from the bottom toward the top of the bowl and there deliver them, an alining member adapted to receive said articles and provided with means for disposing them and for discharging them in orderly array, and a clearing member comprising a rotatable shaft carried in operative relationship to the bowl and alining member respectively, connecting means on the shaft adapted to receive rotation by successive engagement with the scoops, and a sweeper on the shaft in operative proximity to the alining member.

12. In a machine of the kind described, the combination with a body, a movable member, and an alining member adapted to receive articles supplied to it by operation of the movable member and to dispose and discharge them in orderly array, of constant driving mechanism in yielding operative communication with said movable member.

13. In a machine of the kind described, the combination with a body, a rotary lifter-bowl, and an alining member in operative communication with the lifter-bowl for the purpose specified, of constant driving mechanism in operative communication with the bowl, means for setting the driving mechanism in motion, and means for compelling uninterrupted normal operation of the driving mechanism, when set in motion, during a determinate period measured by rotation of the bowl.

14. In a machine of the kind described, the combination with a body, a rotary lifter-bowl, and an alining member in operative communication with the lifter-bowl for the purpose specified, of constant driving mechanism in operative communication with the bowl, and means for automatically interrupting the rotation of the bowl without interrupting operation of the driving mechanism.

15. In a machine of the kind described, the combination with a body, a rotary lifter-bowl, and an alining member in operative communication with the lifter-bowl for the purpose specified, of constant driving mechanism in operative communication with the bowl, and means for automatically interrupting the rotation of the bowl without interrupting operation of the driving mechanism, said last named means comprising a worm and gear connection between the bowl and the driving mechanism wherein a loose worm is provided with means for coupling and uncoupling it to the driving mechanism, the coupling and uncoupling movement of the worm being dependent upon the freedom of rotative movement of the gear, substantially as set forth.

16. The combination with a hopper comprising a body, a movable member, an alining member in operative communication with the movable member for the purpose specified, and a constant driving mechanism for the movable member, of a major machine to which the hopper is subsidiary, its driving mechanism, and an automatically controlled actuator in operative communication with the driving mechanism of the hopper so as to set it in motion.

17. The combination with a hopper comprising a body, a movable member, an alining member in operative communication with the movable member for the purpose specified, and a constant driving mechanism for the movable member, of a major machine to which the hopper is subsidiary, its driving mechanism, an actuator in operative communication with the driving mechanism of the hopper so as to set it in motion, and means for compelling operation of the hopper driving mechanism, when once set in motion, for an independent determinate period.

18. The combination with a hopper comprising a body, a movable member, an alining member in operative communication with the movable member for the purpose specified, and driving mechanism for the movable member, of a lever provided with alternately operative means for interrupting discharge of articles from the alining member and for setting the driving mechanism in motion, whereby operation of said lever to interrupt motion of the driving mechanism automatically interrupts the discharge of articles.

19. The combination with a hopper comprising a body, a movable member, an alining member in operative communication with the movable member for the purpose specified, and driving mechanism for the movable member, of a lever provided with alternately operative means for interrupting discharge of articles from the alining member and for setting the driving mechanism in motion, whereby operation of said lever to interrupt motion of the driving mechanism automatically interrupts the discharge of articles, a detachable article delivery chute disposed in operative proximity to the discharge end of the alining member, and means upon the lever aforesaid for securing the chute when the lever is thrown to setting the driving mechanism in motion and for liberating it upon reverse movement of the lever.

20. The combination with a hopper comprising a body, a movable member, an alining member in operative communication with the movable member for the purpose specified, and an electric motor for the movable member, of a major machine to which the hopper is subsidiary, an actuator on the major machine, and a switch including a movable electric terminal in operative communication with the actuator and adapted to make and break circuit through the motor.

21. The combination with a hopper comprising a body, a movable member, an alining member in operative communication with the movable member for the purpose specified, and an electric motor for the movable member, of a major machine to which the hopper is subsidiary, an actuator on the major machine, and a switch including a movable electric terminal in operative communication with the actuator and adapted to make and break circuit through the motor, said terminal being carried by a lever whose operation is made dependent upon relative disposition thereto of the movable member aforesaid.

22. The combination with a hopper comprising a body, a movable member, an alining member in operative communication with the movable member for the purpose specified, and an electric motor for the movable member, of a major machine to which the hopper is subsidiary, an actuator on the major machine, a movable electric terminal in operative communication with the actuator and adapted to make and break circuit through the motor, said terminal being carried by a lever whose operation is made dependent upon relative disposition thereto of the movable member aforesaid, and a switch including a lever adapted to make and break the motor circuit and provided with means alternately operative therewith for interrupting discharge of articles from the alining member.

In testimony whereof we have hereunto set our hands in the presence of two subscribing witnesses.

ALBERT J. MATTER.
FREDRICK V. CONLEY.

Witnesses:
    JOSEPH L. ATKINS,
    HOWARD O. ROGERS.